United States Patent Office 3,011,002
Patented Nov. 28, 1961

3,011,002
PROCESS FOR THE MANUFACTURE OF GLYCOLS, GLYCEROL AND HEXITOL FROM DILUTE SUGAR SOLUTION
Johann Giesen, Haldenstein, near Chur, Switzerland, and Fritz Müller, deceased, late of Chur, Switzerland, by Gertrud Müller-Grunwaldt, administratrix, Chur, Switzerland, assignors to Inventa A.G. fuer Forschung und Patentverwertung, Zurich, Switzerland
No Drawing. Filed Mar. 6, 1958, Ser. No. 719,979
1 Claim. (Cl. 260—635)

The present invention pertains to a process whereby glycols can be produced from dilute wood sugar solutions by hydrogenation of the liquor.

In the saccharification of wood with dilute mineral acids, the sugar solution cannot be utilized economically, because large amounts of energy are required when processing is carried out to recover glucose, or in the alcohol fermentation when sugar is degraded to ethanol.

It is known that wood sugars can be converted by hydrogenation into hexitols and pentitols, which, in turn, can be changed by hydrogenation-splitting into low-carbon glycols, e.g. glycerol, ethylene glycol and propylene glycol. However, when wood sugar solutions are used, either they or the resulting hexitol-pentitol solutions must be concentrated before hydrogenation-splitting is performed.

It is the object of the present invention to produce glycols from dilute wood sugar solutions in an economical manner. For this purpose, the liquor is clarified in a known manner, freed from the acids, and subjected to hydrogenation. The resulting hexitol-pentitol solution is concentrated by absorption onto absorbents impregnated with substances capable of forming complexes and is extracted therefrom with neutral liquids. The amount of the latter is less than that of the solvent used in the absorption stage. This absorption process yields a concentrated hexitol-pentitol solution, which then is subjected to hydrogenation-splitting. The split-products obtained, singularly or together, are absorbed onto absorbents impregnated with complex-formers and are extracted with neutral liquids whose quantities are less than those used in the absorption stage.

The wood sugar solution is produced according to a known process by hydrolysis of wood with dilute sulfuric acid. The sulfuric acid is neutralized with lime, and the humic acids present are removed by clarification in a known manner, e.g. by means of activated carbon.

Aside from hexoses and pentoses, the remaining solution also contains organic acids, such as formic acid, acetic acid and levulinic acid. These can be recovered by absorption onto ion exchangers. The remainder then contains solely hexoses and pentoses. This solution can be hydrogenated directly, preferably under slight pressure and increased temperatures, e.g., 80° C., and in the presence of the usual hydrogenation catalysts.

The solution now contains the carbohydrates in the form of polyalcohols, which must be concentrated to approximately 40 percent before hydrogenation-splitting. According to the present invention, this is accomplished by absorption of the dilute solution onto absorbents which are impregnated with complex-formers, followed by extraction with a neutral liquid whose quantity corresponds to the desired hexitol-pentitol concentration. Suitable absorbents are activated carbon, silica gel, ion exchangers, and others. As complex-formers, applied for the impregnation of the absorbents in aqueous solution, can be used, e.g., boric acid, borax and ions of zinc, aluminum, iron, and others, in the presence of alkalies, such as ammonia, sodium hydroxide, etc. For the extraction of the polyalcohols from the absorbent, neutral liquids, such as salt solutions, water or others, are employed.

The concentrates thus derived then are split, e.g., in a known manner at elevated temperatures, increased pressure, and in the presence of suitable catalysts and hydrogen. This results in the formation of glycols containing less than 5 carbon atoms, e.g., glycerol, propylene glycol and ethylene glycol. The mixture again is deposited onto absorbents impregnated with complex-formers. This can be accomplished in various ways, for instance, as formerly described elsewhere by the inventors, by using selective absorbents. In that case, the several split-products are separated. However, absorbents can be employed which absorb all split-products without separation. Extraction of the separated or non-separated glycols from the absorbents again is effected with neutral liquids. These neutral liquids simultaneously may extract part of the complex-formers.

After selective absorption, hexitol can be extracted with a neutral salt solution, e.g., sodium sulfate, glycerol with hexitol solution, 1,3-propylene glycol with water, etc. If lesser amounts of neutral liquids are used in the extraction than solvents had been used in the absorption stage, a simultaneous concentration of the glycols occurs.

In order to explain the invention more fully, the following examples are presented. However, it should be understood that these examples merely serve to illustrate, not to limit the invention, and that many changes in the details can be made without departing from the spirit of the invention.

Parts given are by weight.

Example 1

A 4 percent sugar liquor, produced according to the Scholler process, is clarified in the known manner with activated carbon, freed from acids, and hydrogenated in a known manner to hexitol-pentitol solution. 1,000 parts of the latter clear solution of 4 percent concentration are put through a column containing 200 parts anion exchanger Permutit ESB (registered trade mark). The ion exchanger previously had been activated with a concentrated borax solution, and the excess washed out with water until the washwater was free from borax. The solution is practically free from hexitol after having passed through the column. For the extration, 100 parts of a 15 percent sodium sulfate solution are used. The resulting solution contains approximately 32 percent hexitol and pentitol and 3.5 percent boric acid.

Example 2

This example corresponds in all details to Example 1, except that a 15 percent ammonium sulfate solution is used as extractant instead of sodium sulfate. The result is the same as in Example 1. The solution obtained contains approximately 32 percent hexitol and pentitol and 3.5 percent boric acid.

Example 3

A hexitol solution, produced according to Examples 1 or 2, is hydrogenated in the known manner to glycols. The resulting solution contains:

| | Percent |
|---|---|
| Hexitol | 10 |
| Glycerol | 10 |
| 1,2-propylene glycol | 5 |
| Ethylene glycol | 5 |
| 1,3-propylene glycol | 5 |

1,000 parts of this solution are put through columns containing ion exchangers activated with borax and washed. The first column contains 550 parts IRA 400 (registered trademark: anion exchanger with aromatic matrix and active basic ammonium groups). The second column contains 500 parts IRA 400. The third column contains 370 parts Dowex 1 x 8 (registered trademark: anion exchanger with a matrix of polystyrene and active basic ammonium groups). The fourth column contains 410 parts Lewatit MN (registered trademark: anion exchanger with a polystyrene matrix and active basic ammonium groups).

Separation occurs selectively in the sequence as given above.

The solution obtained finally contains pure 1,3-propylene glycol. For the extraction of hexitol, glycerol, 1,2-propylene glycol and ethylene glycol, the following liquids are employed:

For hexitol: 300 parts of 15% sodium sulfate solution.
For glycerol: 300 parts of a 32% hexitol solution.
For 1,2-propylene glycol: 200 parts water.
For ethylene glycol: 200 parts water.

Thus are produced:

300 parts 33% sorbitol solution,
300 parts 33% glycerol solution,
200 parts 25% 1,2-propylene glycol solution,
250 parts 20% ethylene glycol solution,
1000 parts 5% 1,3-propylene glycol solution.

What we claim is:

In a process for the manufacture of glycols, glycerol and hexitol from dilute wood sugar solutions, in which the liquor first is clarified, acids are removed therefrom, and hydrogenation is carried out; the steps which comprise concentrating the resulting hexitol-pentitol solution by absorbing same onto organic ion exchangers which are impregnated with complex-formers selected from the group consisting of borax and boric acid; extracting the concentrate with solvents selected from the group consisting of water, aqueous sodium sulfate solution, aqueous ammonium sulfate solution and hexitol solution, the amount of solvent being approximately one-tenth the amount of the original solution employed for the absorption; subjecting the concentrate thus obtained to hydrogenation-splitting, thereby obtaining a mixture comprising hexitol, glycerol, ethylene glycol, 1.2-propylene glycol and 1.3-propylene glycol; separating the ingredients of said mixture by absorbing the hexitol on an organic anion exchanger capable of absorbing hexitol; glycerol by absorbing it on an organic anion exchanger capable of absorbing glycerol; ethylene glycol on an organic anion exchanger capable of absorbing ethylene glycol; 1.2-propylene glycol on an organic anion exchanger capable of absorbing 1.2-propylene glycol; all of said organic ion exchangers being impregnated with said complex-formers; the 1.3-propylene glycol remaining in the solution; and extracting said hexitol with sodium sulfate solution; said glycerol with hexitol solution; said ethylene glycol and said 1.2-propylene glycol with water.

References Cited in the file of this patent

UNITED STATES PATENTS

| | | |
|---|---|---|
| 1,915,431 | Bockmuhl et al. | June 27, 1933 |
| 2,335,731 | Bottoms | Nov. 30, 1943 |

FOREIGN PATENTS

| | | |
|---|---|---|
| 515,820 | Canada | Aug. 23, 1955 |

OTHER REFERENCES

Zager et al.: Ind. Eng. Chem., vol. 43, pages 1070–3 (1951).

Khym et al.: J.A.C.S., vol. 74, pages 2090–4 (1952).

Zill et al.: J.A.C.S., vol. 75, pages 1339–42 (1953).

Calmon et al.: "Ion Exchanger in Organic and Biochemistry," Chapter 20, pages 392–417 (pages 412–13 relied on), Interscience, N.Y., 1957.

Lederer et al.: Chromatography (2nd Ed.), pages 83–4, 96–7 (1957).